United States Patent
Akhtar et al.

(10) Patent No.: US 11,324,073 B2
(45) Date of Patent: May 3, 2022

(54) FORMING SPATIAL REUSE GROUPS IN WIFI NETWORKS

(71) Applicant: Arista Networks, Inc., Santa Clara, CA (US)

(72) Inventors: Nadeem Akhtar, Mumbai (IN); Preyas Hathi, Pune (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/028,932

(22) Filed: Sep. 22, 2020

(65) Prior Publication Data
US 2022/0095416 A1    Mar. 24, 2022

(51) Int. Cl.
| | |
|---|---|
| *H04W 4/00* | (2018.01) |
| *H04W 84/12* | (2009.01) |
| *H04W 88/08* | (2009.01) |
| *H04W 48/16* | (2009.01) |
| *H04W 24/10* | (2009.01) |
| *H04W 60/06* | (2009.01) |

(52) U.S. Cl.
CPC .......... *H04W 84/12* (2013.01); *H04W 24/10* (2013.01); *H04W 48/16* (2013.01); *H04W 60/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2020/0083969 A1* | 3/2020 | Patwardhan | H04W 48/16 |
| 2021/0014695 A1* | 1/2021 | Minotani | H04W 72/04 |

* cited by examiner

*Primary Examiner* — Suhail Khan
(74) *Attorney, Agent, or Firm* — Fountainhead Law Group P.C.

(57) ABSTRACT

Generating access point-specific spatial reuse groups for a given access point (AP) includes identifying radio frequency (RF) proximate to the given AP. The given AP uses a predefined threshold value to compare against the received signal strength indicators (RSSIs) of detected signals transmitted by other APs to identify RF proximate APs. The given AP can broadcast a spatial reuse group bitmap that identifies the RF proximate APs so that stations associated with the given AP can determine whether to transmit in a channel that is already occupied by an AP.

18 Claims, 10 Drawing Sheets

| ASRG Member | BSS Color | ASRG Member Position in Bitmap |
|---|---|---|
| AP10 | 1 | 1 |
| AP11 | 5 | 5 |
| AP12 | 12 | 12 |
| AP13 | 30 | 30 |

FIG. 7A

SRG bitmap bit 0 ... bit 7

| 0 | 1 | 0 | 0 | 0 | 1 | 0 | 0 |
|---|---|---|---|---|---|---|---|
| 0 | 0 | 0 | 0 | 1 | 0 | 0 | 0 |
| 0 | 0 | 0 | 0 | 0 | 0 | 0 | 0 |
| 0 | 0 | 0 | 0 | 0 | 0 | 1 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 | bit 63

FIG. 7B

FORMING SPATIAL REUSE GROUPS IN WIFI NETWORKS

BACKGROUND

The Institute of Electrical and Electronics Engineers (IEEE) 802.11 family of specifications define the underlying technology for implementing WiFi. Spatial Reuse (SR) is a feature introduced in the IEEE 802.11ax standard, or simply 802.11ax. Spatial reuse refers to the idea that an 802.11ax access point (AP) or station (client) can transmit on a channel in parallel (concurrently) with an ongoing overlapping basic service set (OBSS) transmission on the same channel. The 802.11ax specification, however, does not define a mechanism to form spatial reuse groups (SRGs).

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 7A and 7B show an example of representing an ASRG in an SRG bitmap.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
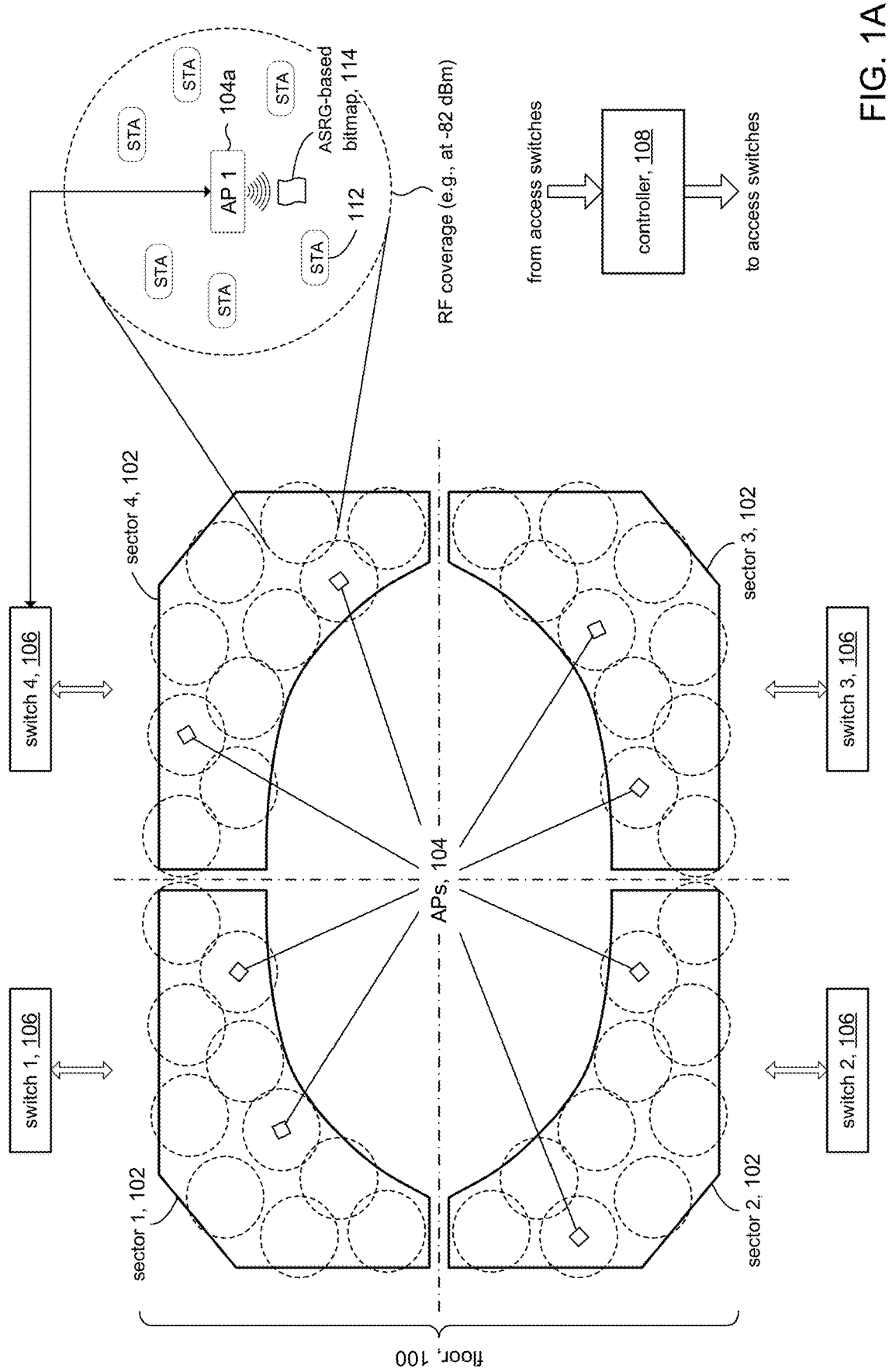
FIG. 1A shows a deployment of access points (APs).

FIG. 1A shows a floorplan of a network of access points (APs) 104 (AP network) deployed on floor 100. In some embodiments, floor 100 may be divided into sectors 102. The floorplan in FIG. 1A, for instance, shows four sectors, numbered sector 1, sector 2, sector 3, and sector 4. Sectors 102 can be defined according to access switches 106 to which the APs are connected. For example, APs in sector 1 are connected to access switch 1, APs in sector 2 are connected to access switch 2, and so on. FIG. 1A shows a configuration where APs are deployed on floor 100 according to their connectivity to access switches 106. It will be appreciated that sector-to-switch mapping be one-to-one. In other configurations, APs connected to a given access switch can be deployed anywhere on the floor and need not be limited to a given sector.

An AP can be associated with (associated to, connected to) several stations (clients) 112 that are in wireless communication with the AP; i.e., within radio frequency (RF) coverage of the AP. Consider AP1 (AP 104a), for instance, where the dashed circle illustrates RF coverage for AP1; e.g., at −82 dBm.

Central controller 108 can provide configuration information about the network of APs 104 deployed on floor 100. As discussed below in some embodiments, the configuration information can be in the AP itself. In some embodiments, however, central controller 108 can provide access switch connectivity information to the APs.

In accordance with some embodiments, each AP on the floor can generate a spatial reuse group specific to that AP, referred to as an AP-specific spatial reuse group (ASRG). An AP can broadcast its ASRG in a bitmap, which is illustrated in FIG. 1A for example as ASRG-based bitmap 114. The bitmap can be detected by stations associated to the AP, which can use the bitmap to identify spatial reuse opportunities in order to transmit on an occupied channel.

Figure 1B:
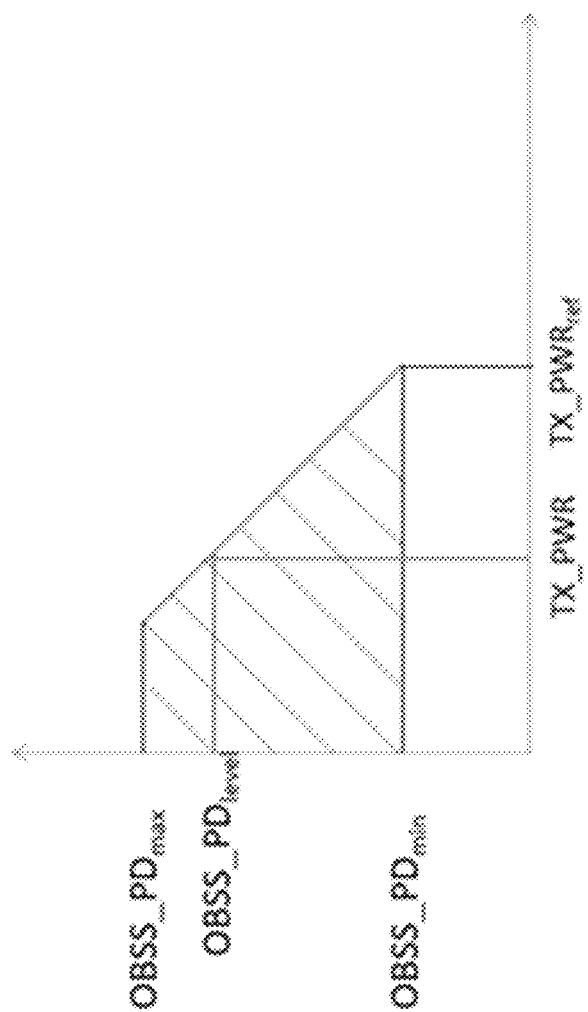
FIG. 1B is a graphical representation of the adjustment rules for OBSS-PD and transmission power.

As noted above, Spatial Reuse (SR) is a new feature introduced in 802.11ax. Spatial reuse refers to the idea that an 802.11ax access point (AP) or station can transmit on a channel in parallel with an ongoing overlapping-BSS (OBSS) transmission on the same channel. An AP or a station that decides to transmit using spatial reuse (i.e. in parallel with an ongoing co-channel transmission) adjusts its transmit (Tx) power depending on the detected OBSS-power detection (OBSS-PD) level (OBSS_PD$_{level}$). FIG. 1B, for instance shows a representation of the adjustment rules for OBSS-PD power level and transmission power.

The OBSS_PD$_{level}$ value lies between the OBSS_PD$_{max}$ and OBSS_PD$_{min}$ thresholds. The Tx power adjustment essentially keeps the interference on the channel at an acceptably low level: when the OBSS signal is strong, OBSS-PDlevel is increased, and the SR transmission is done using a lower Tx power; with a weak OBSS signal, the SR transmission can be done at a higher Tx power.

802.11ax includes the concept of a spatial reuse group (SRG), which is a group of APs such that all APs in the group use the same OBSS-PD thresholds (OBSS_PD$_{max}$ and OBSS_PD$_{min}$). Because the Tx power during an SR transmission depends on the OBSS_PD$_{level}$, forming a group of APs with common OBSS-PD thresholds becomes a way for multiple co-channel APs and stations to agree upon and maintain a mutually acceptable interference level. In other words, APs in an SRG and their stations coordinate spatial reuse by using the same OBSS-PD thresholds.

SRG OBSS-PD threshold values and group membership are signaled by all APs belonging to the SRG. An SRG BSS Color Bitmap field in the beacon indicates the BSS colors of APs that are members of the SRG. A station uses this information to identify if a received inter-BSS Physical Layer Conformance Procedure (PLCP) Protocol Data Unit (PPDU) is an SRG PPDU; i.e., if the transmission it can hear is from a member AP. If it is, then the station honors the SRG OBSS-PD thresholds in its SR transmission.

Given that an SRG is a cooperative approach to controlling interference in the channel, we can optimize the SRG membership in accordance with the present disclosure to reduce interference while expanding the opportunity for spatial reuse transmissions. The SRG can be represented as a 64-bit bitmap per 802.11ax, which limits the number of members in an SRG to 63 members; bit 0 is not used. By definition, an SRG should include members that can interfere with each other. Moreover, in accordance with the present disclosure, an SRG can omit co-channel members that do not interfere with each other because co-channel members that do not interfere with each other would not benefit from being in an SRG and so should not consume an entry in the SRG bitmap.

Figure 2A:
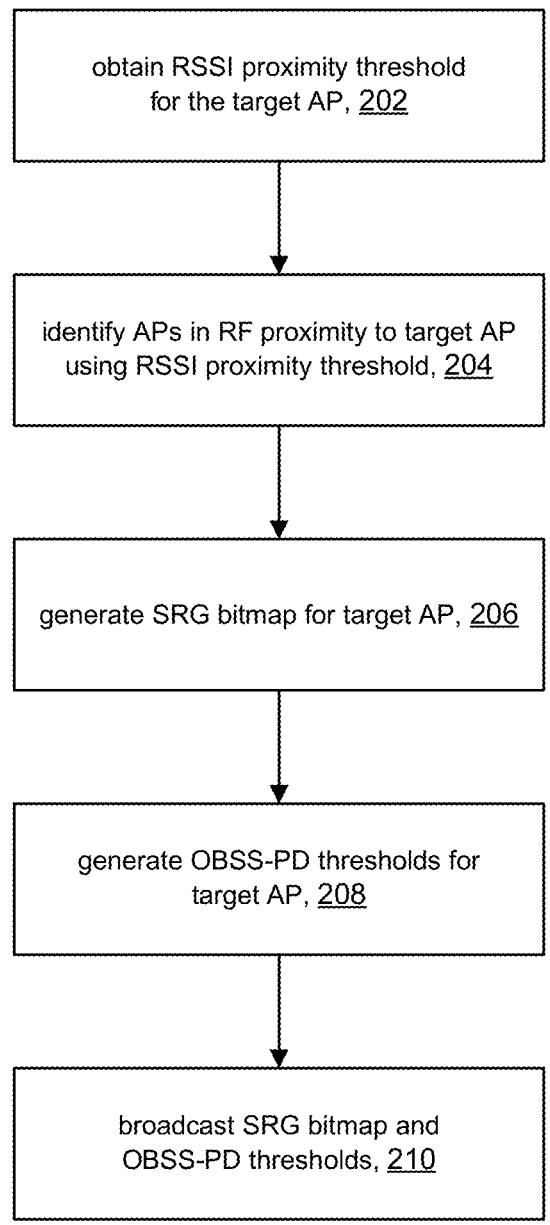
FIG. 2A shows high-level processing in an AP in accordance with the present disclosure.

Referring to FIG. 2A, the discussion will now turn to a high level description of processing in an AP (e.g. 104a) among a network of APs to define an AP-specific SRG in accordance with the present disclosure. In accordance with some embodiments, ASRGs can be defined on a per radio basis. For example, if the AP has a 2.4 GHz radio and a 5 GHz radio, the AP can perform the following operations to define two ASRGs. Likewise, in accordance with some embodiments, ASRGs can be defined on a per BSS basis. For example, suppose the AP participates in multiple service sets: BSS-1 and BSS-2. The AP can perform the following operations to define an ASRG for stations in the BSS-1 service set and again to define another ASRG for stations in the BSS-2 service set.

In accordance with some embodiments, each AP in the network of APs can perform the processing described below to define an ASRG that is specific to that AP. In some embodiments, the AP can include computer executable program code, which when executed by a processor (e.g., 802, FIG. 8) in the AP, causes the AP to perform processing in accordance with FIG. 2A. The operations performed are not necessarily limited to the order shown.

The following operations are described with respect to a "target AP" which performs the operations. It is understood that in accordance with the present disclosure, each AP in the network of APs can perform the operations to define an ASRG specific to that AP.

At operation 202, the target AP can obtain a received signal strength indication (RSSI) proximity threshold value. In some embodiments, the RSSI proximity threshold can be manually programmed by a user (e.g., network manager). In other embodiments, for example in a large network of APs, a central controller (e.g., controller 108) can send an RSSI proximity threshold value to each AP in the network of APs (AP network), including the target AP. In some embodiments, the RSSI proximity threshold can be the same value for each AP. In other embodiments, the RSSI proximity threshold can be different among APs in the AP network.

At operation 204, the target AP can identify other co-channel APs in the AP network using its RSSI proximity threshold. In some embodiments, for example, each AP in the AP network transmits a signal (e.g., a beacon signal) that may be detected by the target AP. The target AP can generate an RSSI value that indicates the signal strength of the detected signal. If the RSSI generated for a given detected signal is greater than the RSSI proximity threshold associated with the target AP, then the AP that transmitted the signal can be deemed to be in radio frequency (RF) proximity to the target AP. The RSSI proximity threshold can be used to identify all APs that are in RF-proximity to the target AP. RF-proximate APs can then be identified from identifying information (ID) contained in their respective signals. The identified APs can be collectively referred to as an RF proximity domain of the target AP.

At operation 206, the target AP can generate an SRG bitmap that identifies the APs in the RF proximity domain of the target AP. This aspect of the present disclosure is discussed in more detail below.

At operation 208, the target AP can generate OBSS-PD threshold values for the RF proximity domain, although the computation of OBSS-PD thresholds is beyond the scope of the present disclosure.

At operation 210, the target AP can broadcast the SRG bitmap and OBSS-PD threshold values, which can then be detected by stations associated with the target AP. In some embodiments, for example, the SRG bitmap and OBSS-PD threshold values can be broadcast in a management frame. This aspect of the present disclosure is discussed further below.

Processing of an ASRG can be deemed complete. As noted above, the foregoing operations can be performed by each AP in the network of APs.

Figure 2B:
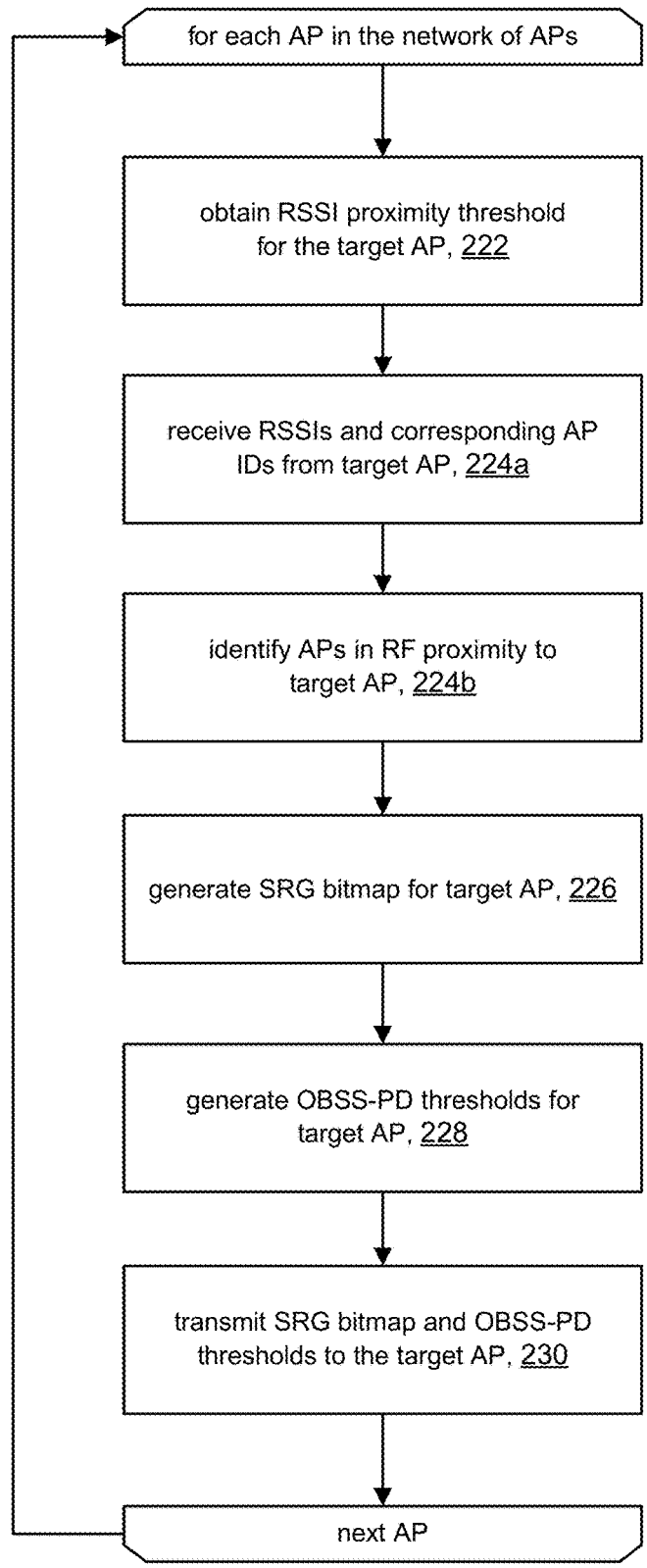
FIG. 2B shows high-level processing in a controller in accordance with the present disclosure.

Referring to FIG. 2B, the discussion will now turn to a high level description of processing in a central controller (e.g. 108) to generate AP-specific SRGs (ASRGs) for APs in a network of APs in accordance with the present disclosure. In some embodiments, the controller can include computer executable program code, which when executed by a processor (e.g., 802, FIG. 8) in the controller, causes the controller to perform the processing in accordance with FIG. 2B. The operations performed are not necessarily limited to the order shown.

The controller can process each AP (the "target AP") in the network of APs (AP network) as follows. Moreover, as noted above, in accordance with some embodiments, an ASRG can be defined on a per radio basis. For example, if the target AP has a 2.4 GHz radio and a 5 GHz radio, the controller can define two ASRGs in the target AP; one ASRG for each radio.

At operation 222, the controller can obtain a RSSI proximity threshold value for the target AP. In some embodiments, the RSSI proximity threshold can be manually programmed by a user (e.g., network manager). In some embodiments, the RSSI proximity threshold can be the same value for each AP. In other embodiments, the RSSI proximity threshold can be different among APs in the AP network.

At operation 224a, the controller can receive RSSI values and corresponding AP identifiers from the target AP. As explained above, when the target AP detects a signal (e.g., a beacon signal) from another AP, the target AP can generate a corresponding RSSI value that indicates the signal strength of the detected signal. In some embodiments, the target AP can be configured to transmit to the controller the RSSI for each beacon that it detects along with an AP identifier contained in the beacon of the transmitting AP. In some embodiments, for example, the AP identifier can be a BSS color assigned to the AP.

At operation 224b, the controller can use the RSSI proximity threshold associated with the target AP to identify RF-proximate APs based on the received RSSIs. The identified RF-proximate APs can be collectively referred to as an RF proximity domain of the target AP.

At operation 226, the controller can generate an SRG bitmap for the target AP. The SRG bitmap identifies the APs in the RF proximity domain of the target AP. This aspect of the present disclosure is discussed in more detail below.

At operation 228, the controller can generate OBSS-PD threshold values for the RF proximity domain of the target AP. As noted above, the computation of OBSS-PD thresholds is beyond the scope of the present disclosure.

At operation 230, the controller can transmit the SRG bitmap and OBSS-PD threshold values to the target AP. The target AP can then broadcast the SRG bitmap and OBSS-PD threshold values, for example, in a management frame, which can then be detected by stations associated with target AP. This aspect of the present disclosure is discussed further below.

Processing in the controller for the target AP can be deemed complete. Processing can return to the top of the loop (operation 222) to perform processing for the next AP.

The discussion will now turn to a more detailed description of operations to generate ASRGs. The discussion will focus on operations performed by an AP (target AP). It will be appreciated, however, that the operations can be adapted for processing in a central controller to generate the ASRG, which can then be transmitted to the AP, as described in FIG. 2B for example. It is noted that the operations describe generating an ASRG for a given AP, hence AP-specific SRG (ASRG). It will be appreciated that an ASRG can be generated for each AP, and that the ASRG for one AP may be different from the ASRG of another AP.

Figure 3:
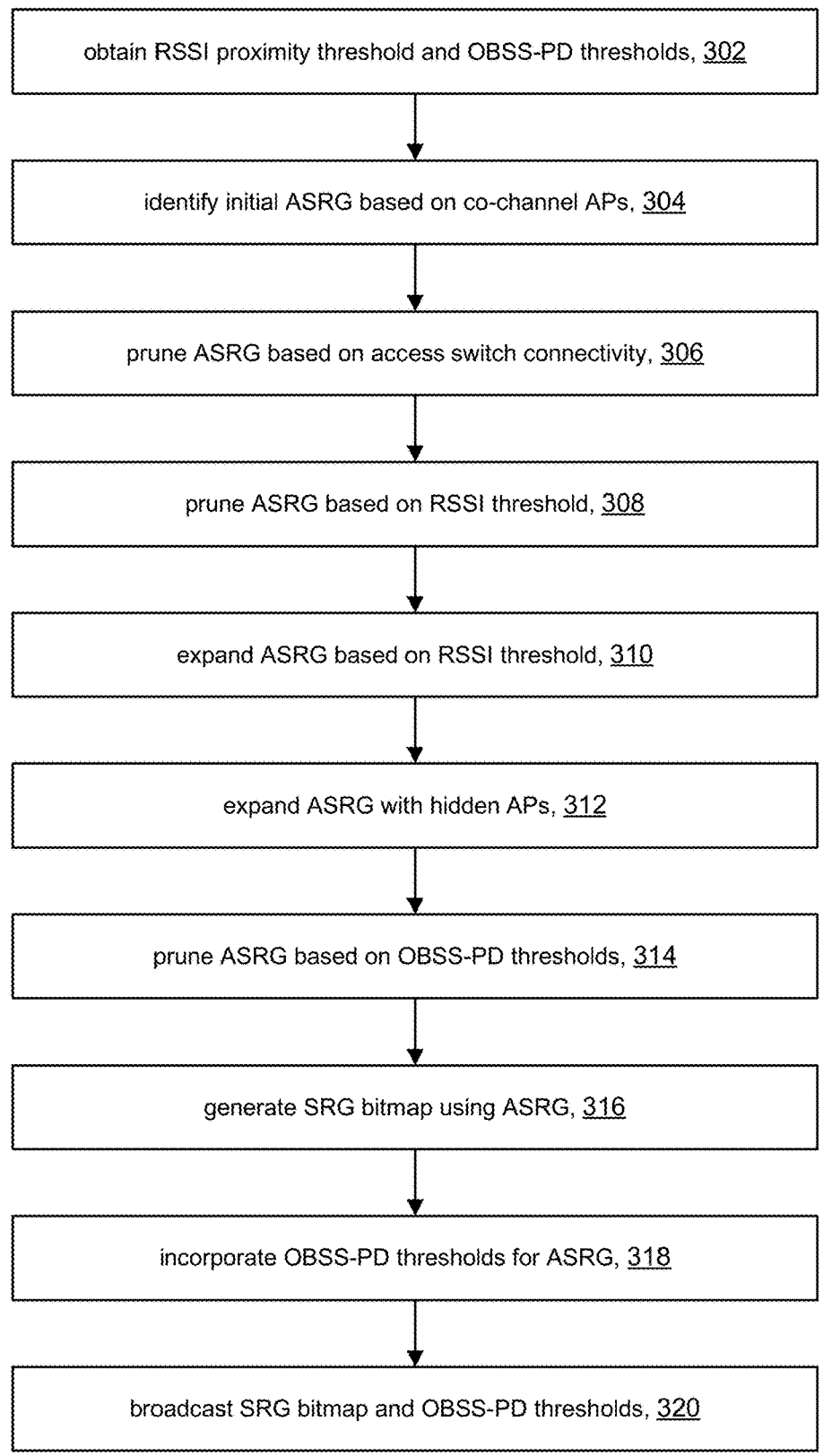
FIG. 3 shows processing details in accordance with an embodiment of the present disclosure.

Referring to FIGS. 3 and 4-7B, the discussion will now turn to a high level description of generating ASRGs, using the illustrative deployment of APs shown in FIG. 1A. The operations shown in FIG. 3 represent processing operations in each AP (e.g. 104a) to generate an ASRG in accordance with the present disclosure. In some embodiments, the AP can include computer executable program code, which when executed by a processor (e.g., 802, FIG. 8) in the AP, causes the AP to perform the processing in accordance with FIG. 3. The operations performed are not necessarily limited to the order shown.

Figure 4:
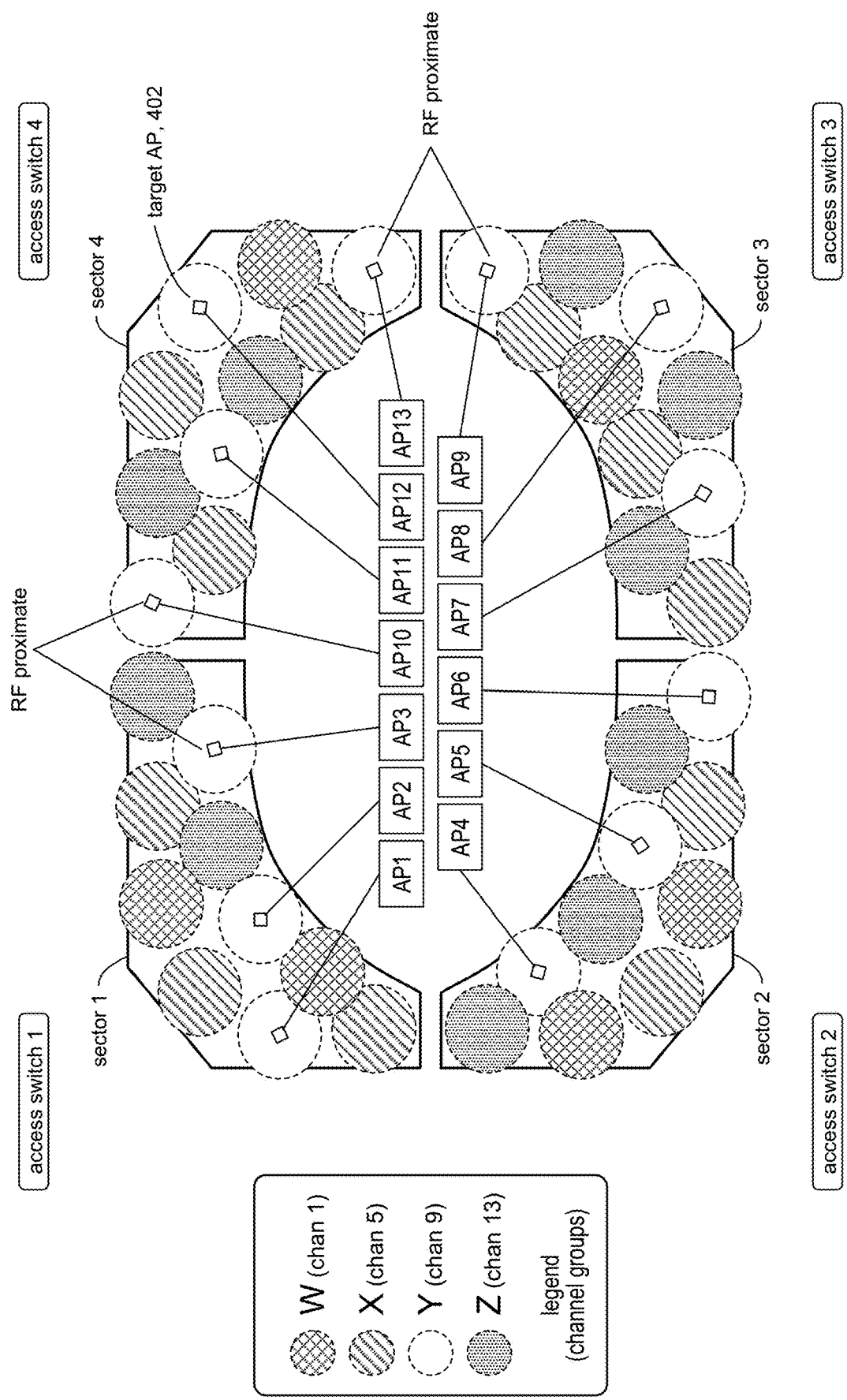
FIG. 4 shows a configuration of a deployment of APs to illustrate the processing shown in FIG. 3.

Reference will be made to FIGS. 4-7B to illustrate aspects of the operations shown in FIG. 3. FIG. 4, for example, illustrates a deployment of APs, which have channels and BSS colors assigned to them. For discussion purposes, we can assume without loss of generality that the APs operate at 2.4 GHz on Channels 1, 5, 9, and 13 (in accordance with the European standard for 2.4 GHz operation). FIG. 4 shows an example of channel assignment among the deployed APs indicated by shading and coded according to the legend. The figure illustrates a deployment where the APs are arranged in four sectors of APs, where APs in a sector (e.g., sector 1) are connected to a corresponding access switch (e.g., access switch 1).

The following operations are described with respect to a "target AP" which performs the operations. It is understood that each AP in the deployment performs the same operations. In accordance with some embodiments, the target AP can define an ASRG on a per radio basis. For example, if the target AP has a 2.4 GHz radio and a 5 GHz radio, the target AP can define two ASRGs. For discussion purposes, consider AP 402 in FIG. 4 as the target AP.

At operation 302, the target AP can obtain an RSSI proximity threshold value. In some embodiments, the RSSI proximity threshold can be manually programmed by a user (e.g., network manager). In other embodiments, for example in a large network of APs, a central controller (e.g., controller 108) can send an RSSI proximity threshold value to each AP in the network of APs (AP network), including the target AP.

The target AP can obtain $OBSS\_PD_{min}$ and $OBSS\_PD_{max}$ threshold values. In some embodiments, the target AP can generate the $OBSS\_PD_{min}$ and $OBSS\_PD_{max}$ thresholds. In other embodiments, the target AP can receive the threshold values from a central controller (e.g., controller 108). The computation of the $OBSS\_PD_{min}$ and $OBSS\_PD_{max}$ threshold values are beyond the scope of the present disclosure.

At operation 304, the target AP can identify an initial ASRG whose members are APs in the AP network that are co-channel with the target AP. Two APs that use the same primary channel are deemed to be "co-channel." The term co-channel can also refer to two APs that share an overlapping channel. For example in the 2.4 GHz band, Channels 1, 2, 3 and 4 overlap with each other. Accordingly, an AP operating on Channel 1 will be considered to be co-channel with an AP operating on Channel 3. In the 5 GHz band, co-channel can include "channel bonding." For example, channels 36 and 40 can be bonded to create a single 40 MHz channel with Channel 36 as the primary and Channel 40 as the secondary channel. In this case, an AP using 40 MHz bandwidth with Channel 36 as primary will be considered co-channel with an AP using 20 MHz bandwidth with Channel 40 as its primary.

In some embodiments, for example, information about APs that are co-channel with the target AP can be obtained from configuration information stored at a central controller. In other embodiments, an AP can learn of co-channel APs by listening to the beacons transmitted by other APs in the AP network. Referring to the example in FIG. 4, suppose the following co-channel groups exist:

TABLE 1

| Group Name | No. of APs in Group |
| --- | --- |
| W | 6 |
| X | 11 |
| Y | 13 |
| Z | 10 |

In our example, the target AP is in the Y channel group, in which case the initial ASRG for the target AP is the set of co-channel APs in the Y channel group, which in FIG. 4 are numbered from AP1 to AP13.

At operation 306, the target AP can remove (prune) APs contained in its ASRG based on access switch connectivity. Spatial sub-groups allow stations that are located physically close to each other and operating on the same channel, but which are associated with (connected to) different APs, to nonetheless transmit using the same OBSS PD parameters. In a large deployment, the APs in the ASRG may be distributed over a wide area. APs that are far from the target AP would not benefit from spatial reuse because there is no risk of RF interference from those distant APs. The distant APs can be regarded as being outside the RF proximity domain of the target AP. Accordingly, those distant APs can be removed from the ASRG so that the target AP and its stations need not consider non-interfering co-channel APs for Spatial Reuse. In this way, the target AP creates its own spatial sub-group that the target AP will broadcast to its stations.

In some embodiments, as a first approximation, the target AP (in group Y) can sub-divide the APs in group Y according to their connectivity to the access switch to yield the following sub-groups:

TABLE 2

| Group Name | Subgroup | Subgroup Members |
| --- | --- | --- |
| Y | Y1 | AP1, AP2, AP3 |
| Y | Y2 | AP4, AP5, AP6 |

TABLE 2-continued

| Group Name | Subgroup | Subgroup Members |
|---|---|---|
| Y | Y3 | AP7, AP8, AP9 |
| Y | Y4 | AP10, AP11, AP12, AP13 |

Each sub-group Y1 to Y4 includes co-channel APs that are connected to the same respective access switch. Referring to FIG. 4, for example, sub-group Y1 contains co-channel APs connected to access switch 1, sub-group Y2 contains co-channel APs connected to access switch 2, and so-on. The ASRG for the target AP (AP12) becomes the sub-group of APs that contains the target AP, which in our example is sub-group Y4. For illustrative purposes, Table 3 below shows additional examples of ASRGs for other APs in the sub-group Y4. It is noted, at this point in the process, the ASRG for each AP in sub-group Y4 comprises the same set of APs:

TABLE 3

| Group | Subgroup | AP | Members of ASRG |
|---|---|---|---|
| Y | Y4 | AP10 | AP10, AP11, AP12, AP13 |
| Y | Y4 | AP11 | AP10, AP11, AP12, AP13 |
| Y | Y4 | AP12 | AP10, AP11, AP12, AP13 |
| Y | Y4 | AP13 | AP10, AP11, AP12, AP13 |

At operation 308, the target AP can remove APs from its ASRG based on the RSSI proximity threshold. For instance, the target AP can end up in a sub-group that has a significantly large number of APs; for example, the access switch that the APs are connected to may have high port density such as 48 or 96 ports. In such configurations, the sub-group may have some APs that are not in RF proximity to the target AP. Referring to FIG. 4, for example, AP10 and AP13 are members of the same sub-group, but may not be in RF proximity to each other (depending on their physical distance from each other).

In accordance with the present disclosure, the RSSI proximity threshold can be used to determine whether two APs are in RF proximity to each other. When the target AP receives a beacon signal transmitted by another AP, hardware in the target AP determines the received signal strength indication (RSSI) for the beacon. The beacon includes an identifier of the transmitting AP. The RSSI associated with the transmitting AP is compared to the target AP's RSSI threshold (obtained at operation 302) to determine whether the transmitting AP is RF proximate the target AP or not. If the RSSI of an AP is less than the RSSI proximity threshold of the target AP, then the AP can be deemed to be not in RF proximity to the target AP. Otherwise, the AP can be deemed to be in RF proximity to the target AP.

Accordingly, the target AP can further prune its ASRG by removing APs from the ASRG that are not in RF proximity to the target AP; i.e., RSSI of the AP is less than the RSSI proximity threshold of the target AP. If the RSSI of the detected beacon is greater than or equal to the target AP's RSSI proximity threshold, then the transmitting AP can be deemed to be in RF proximity to the target AP and remain as a member of the ASRG. Otherwise, the given AP can be deemed not to be RF proximate to the target AP and can be removed from the ASRG. The target AP can repeat this comparison operation with the beacon signal transmitted by the other APs in the ASRG to remove APs from the ASRG that are not in RF proximity to the target AP. Merely to illustrate this, the proximity relationship for each AP in sub-group Y4 might be as shown in the table below:

TABLE 4

|  | AP10 | AP11 | AP12 | AP13 |
|---|---|---|---|---|
| AP10 |  | Y | Y | N |
| AP11 | Y |  | Y | Y |
| AP12 | Y | Y |  | Y |
| AP13 | N | Y | Y |  | where AP10 and AP13 are sufficiently physically distant that they are not RF-proximate to each other. Accordingly, the row for AP10 shows that AP10 is RF-proximate AP11 and AP12 but not AP13. The row for AP11 shows that AP11 is RF-proximate AP10, AP12, and AP13, and so on. Using Table 4, the ASRGs shown in Table 3 for the APs in sub-group Y4 can be pruned as shown below:

TABLE 5

| Group | Subgroup | AP | Members of ASRG |
|---|---|---|---|
| Y | Y4 | AP10 | AP10, AP11, AP12 |
| Y | Y4 | AP11 | AP10, AP11, AP12, AP13 |
| Y | Y4 | AP12 | AP10, AP11, AP12, AP13 |
| Y | Y4 | AP13 | AP11, AP12, AP13 |

The ASRG of an AP can be referred to as the RF proximity domain of the AP because the members of the ASRGs are determined based on the RF proximity threshold.

At operation 310, the target AP can expand its ASRG with APs outside of the target AP's sub-group. At this point, the ASRG consists of APs in the defined sub-group (in our example, sub-group Y4) that are RF-proximate to each other. However, there may be APs outside of the sub-group that are in RF-proximity to the target AP; i.e., APs that are not connected to the same access switch as the target AP. FIG. 4 illustrates some examples. AP3 in sub-group Y1 and AP10 in sub-group Y4 may be deemed to be in RF proximity to each other, depending on their RSSI proximity thresholds and the RSSIs of their respective beacon signals. Likewise, AP13 in sub-group Y4 and AP9 in sub-group Y3 may be deemed to be in RF proximity to each other. Accordingly, in some embodiments, the target AP can compare its RSSI proximity threshold (obtained at operation 302) to the RSSI generated from a beacon signal transmitted by a given AP outside of its sub-group and detected by the target AP. If the RSSI of the detected beacon is greater than the target AP's RSSI proximity threshold, then the given AP can be deemed to be in RF proximity to the target AP and added to the ASRG of the target AP; otherwise, the given AP can be ignored. In our example, suppose the target AP (AP 402) is not RF-proximate any APs outside of the sub-group. The ASRG for the target AP does not change and remains as shown in table 5. However, FIG. 4 shows that AP10 and AP13 to be in RF-proximity with APs outside of the sub-group. The respective ASRGs for AP10 and AP13 can be expanded. The following table shows the ASRG membership of APs in the sub-group Y4 at this point in the process:

TABLE 6

| Group | Subgroup | AP | Members of ASRG |
|---|---|---|---|
| Y | Y4 | AP10 | AP10, AP11, AP12, AP3 |
| Y | Y4 | AP11 | AP10, AP11, AP12, AP13 |

TABLE 6-continued

| Group | Subgroup | AP | Members of ASRG |
|---|---|---|---|
| Y | Y4 | AP12 | AP10, AP11, AP12, AP13 |
| Y | Y4 | AP13 | AP11, AP12, AP13, AP9 |

Table 6 shows that the ASRG for AP10 now includes AP3 from a sub-group other than sub-group Y4, and likewise, the ASRG for AP13 now includes AP9 from a sub-group other than sub-group Y4.

Figure 5:
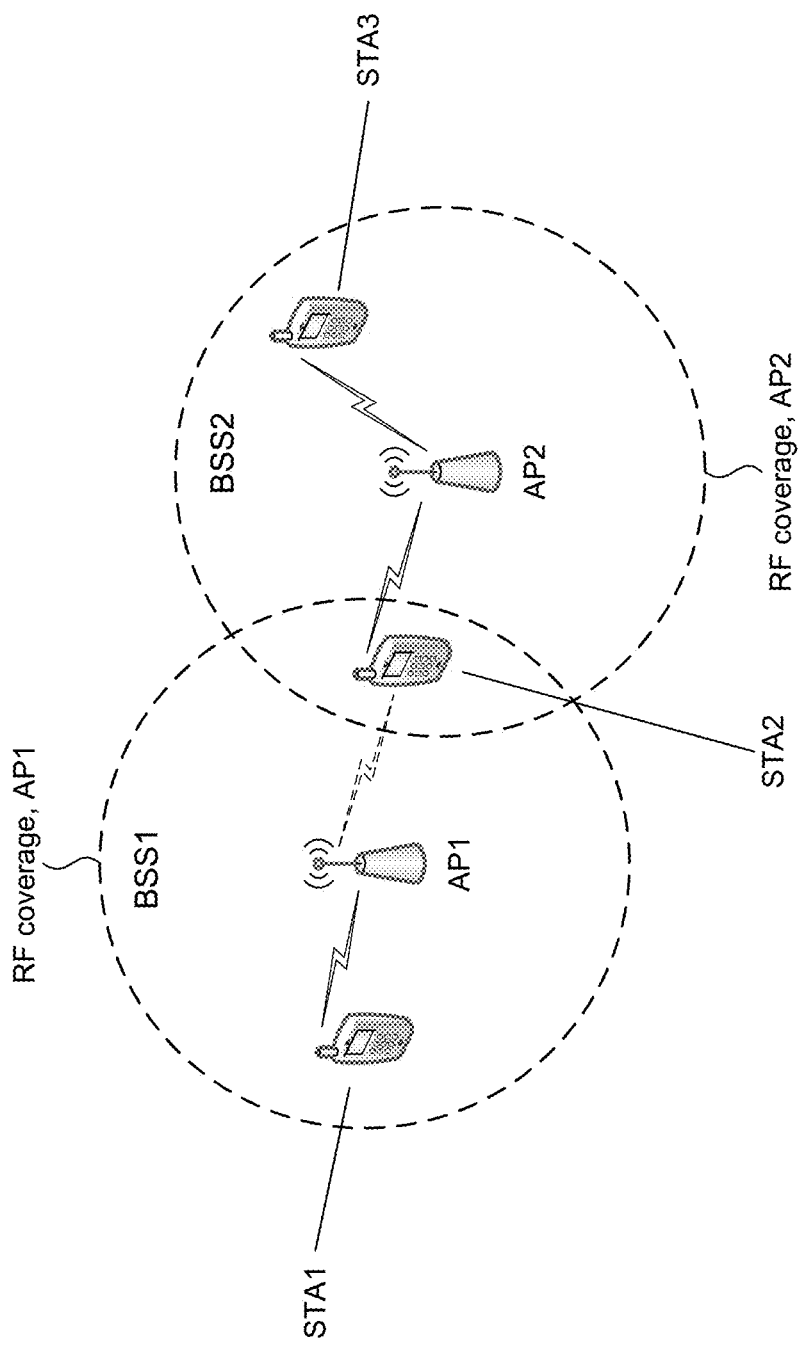
FIG. 5 shows an example of a hidden AP.

At operation 312, the target AP can identify hidden APs and include those hidden APs to its ASRG. In some cases, two co-channel APs that are not in RF proximity of each other may be visible to each other's respective stations (clients); this situation is sometimes referred to as "hidden APs." FIG. 5 illustrates such a configuration. Access points AP1 and AP2 cannot see each other because each AP lies beyond the RF coverage of the other AP; they are hidden from each other. Station STA2 is associated with AP2, but it is positioned such that it can see AP1. As such, AP1 and STA2 can interfere with each other even though STA2 is not associated to AP1. Accordingly, in some embodiments, the target AP can discover hidden APs using information it collects and neighbor reports provided by its stations and add the discovered APs to its ASRG.

At operation 314, the target AP can further prune its ASRG according to its OBSS-PD threshold values. In some embodiments, for example, the target AP can remove APs from its ASRG that do not have the same OBSS-PD threshold values.

Figure 6:
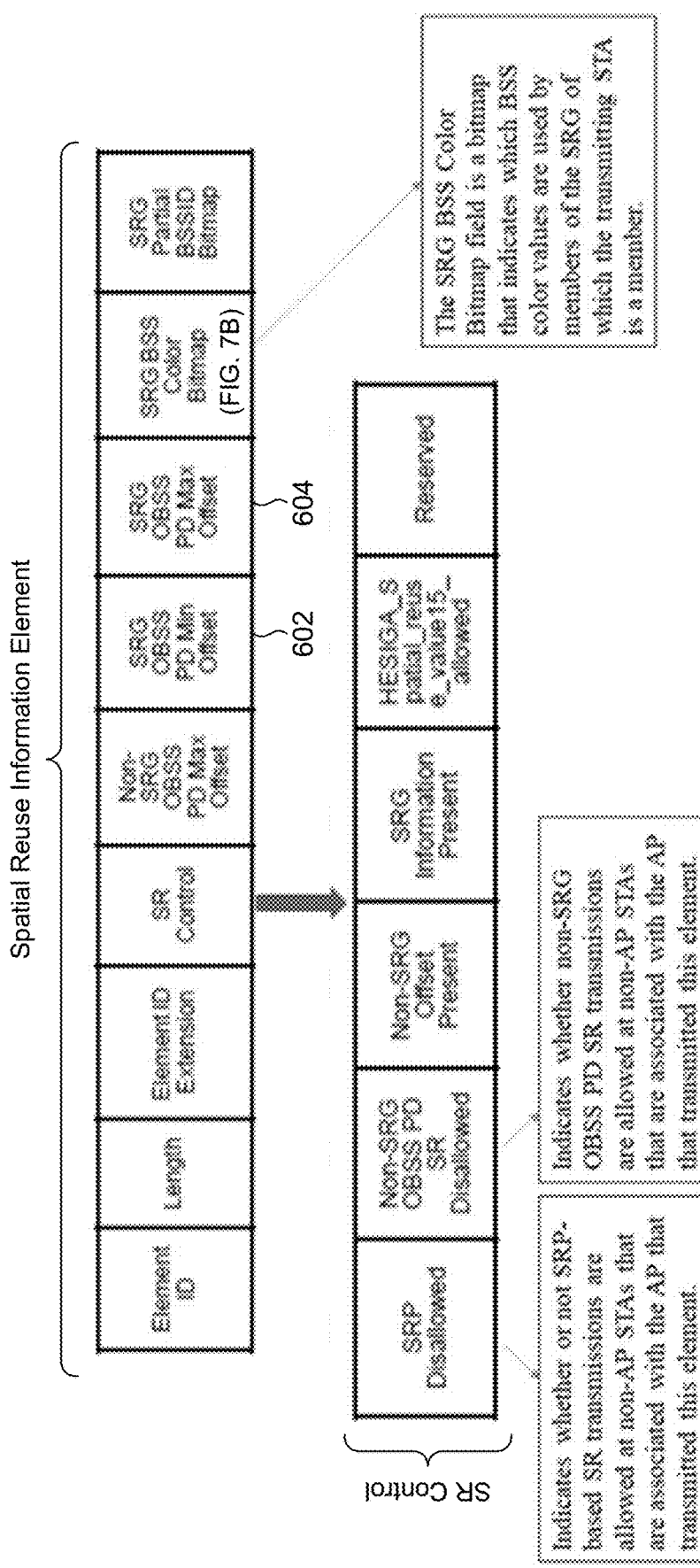
FIG. 6 shows an example of a spatial reuse information element.

At operation 316, the target AP can generate an SRG BSS color bitmap (SRG bitmap, e.g., 114) using the ASRG of the target AP. Referring to FIG. 6, the SRG bitmap is a component in an 802.11ax Spatial Reuse Information Element that can be transmitted by the target AP in various signals such as a beacon signal, an association response signal, a re-association response signal, etc. In accordance with the present disclosure, the SRG bitmap informs or otherwise indicates to stations that associate with the target AP which APs are members of the target AP's ASRG.

An AP can be identified by its BSS color assignment, which is provided in the preamble of the 802.11ax PHY header in a detected signal. In particular, the AP's BSS color assignment is a 6-bit BSS color code in the SIG-A field of the PHY header. Accordingly, when the target AP detects a beacon signal, the BSS color assignment of the transmitting AP can be extracted from the beacon signal and used as an identifier of the transmitting AP.

As shown in Table 6, the members of the ASRG for the target AP, namely AP12, are AP10, AP11, AP12, and AP13. FIG. 7A shows an example of BSS color assignments (expressed as decimal values) for these APs. As can be seen in FIG. 7B, the SRG bitmap is a 64-bit field. The 6-bit BSS color code assigned to each AP is used to set a corresponding bit in the SRG bitmap addressed by the 6-bit code.

At operation 318, the target AP can incorporated the $OBSS\_PD_{min}$, and $OBSS\_PD_{max}$ threshold values (obtained at operation 302) in the Spatial Reuse Information Element in the SRG OBSS PD Max and Min Offset data fields, which are shown in FIG. 6 as respective data fields 602, 604.

At operation 320, the target AP can broadcast the SRG bitmap and OBSS-PD thresholds, for example, in a management frame. When a station associated to the target AP detects the management frame, the station can extract the SRG bitmap from the management frame. The station can use the SRG bitmap to determine if a received frame is from an AP in the target AP's ASRG. For example, the station can extract the BSS color code in the SIG-A field of the PHY header of the received frame. If the bit in the SRG bitmap addressed by the extracted BSS color code is set, then the received frame was sent by a member of the ASRG. The station now knows it can transmit on a channel that is currently occupied by the member AP; the station will honor the OBSS-PD thresholds in its transmission. In accordance with the present disclosure, the SRG bitmap received by a station associated with the target AP informs the station that it can transmit on a channel that is currently occupied by an AP identified in the SRG bitmap.

Processing in accordance with the foregoing can be repeated to recompute, recreate, or otherwise regenerate ASRGs among some or all APs in a deployment. For example, a change in the network topology in the deployment of APs can serve as a trigger to regenerate ASRGs. Network topology can change, for instance, by the addition, removal, or relocation of APs on a floor. The topology can change when APs are connected to different access switches. A change in the RF environment/configuration can trigger a round of regenerating ASRGs; for example, a change in AP channel assignments, transmit power of the APs, change in OBSS-PD thresholds, and so on. Neighbor reports from stations can trigger a round of regenerating ASRGs.

Figure 8:
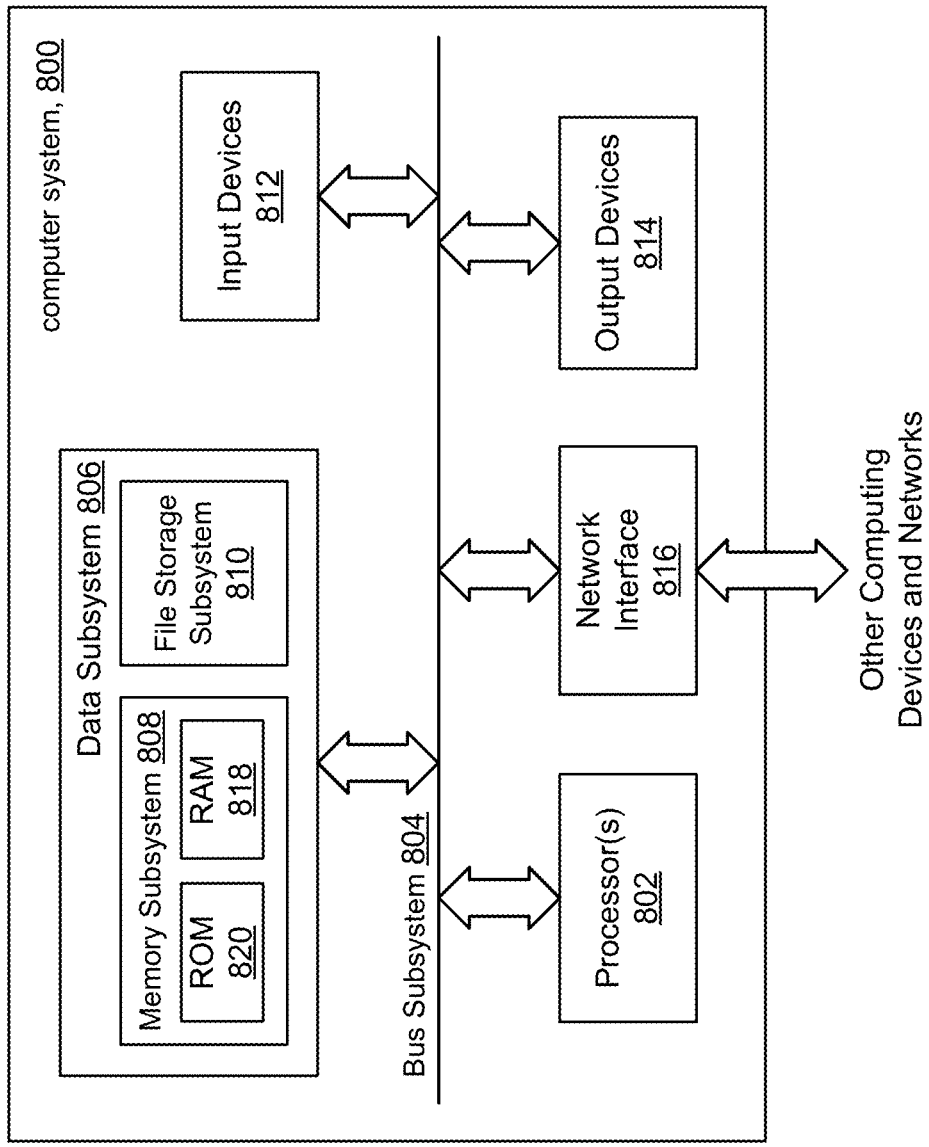
FIG. 8 shows a computer system that can be adapted to operate in accordance with the present disclosure.

FIG. 8 depicts a simplified block diagram of an example computer system 800 according to certain embodiments. Computer system 800 can be used to implement an AP (e.g., 104) and a controller (e.g., 108) described in the present disclosure. As shown in FIG. 8, computer system 800 includes one or more processors 802 that communicate with a number of peripheral devices via bus subsystem 804. These peripheral devices include data subsystem 806 (comprising memory subsystem 808 and file storage subsystem 810), user interface input devices 812, user interface output devices 814, and network interface subsystem 816 (e.g., for connecting an AP to an access switch).

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Data subsystem 806 includes memory subsystem 808 and file/disk storage subsystem 810 represent non-transitory computer-readable storage media that can store program code and/or data, which when executed by processor 802, can cause processor 802 to perform operations in accordance with embodiments of the present disclosure.

Memory subsystem 808 includes a number of memories including main random access memory (RAM) 818 for storage of instructions and data during program execution and read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Further Examples

In accordance with the present disclosure, a method can include obtaining a list of access points (APs), among a plurality of APs, that are co-channel with a target AP; removing from the list of APs one or more APs that are not connected to an access switch to which the target AP is connected; removing from the list of APs one or more APs whose respective associated received signal strength indications (RSSIs) are less than a predetermined RSSI proximity threshold value of the target AP; creating and storing a spatial reuse group (SRG) bitmap to identify members in the list of APs; and broadcasting the SRG bitmap using signaling in accordance with the IEEE 802.11ax standard.

In some embodiments, when the broadcast SRG bitmap is received by a station associated with the target AP, the SRG bitmap indicates to the station that the station can transmit on a channel that is occupied by an AP identified in the SRG bitmap.

In some embodiments, members in the list of APs are identified by respective bit positions in the SRG bitmap, wherein APs are associated with basic service set (BSS) color codes, wherein the BSS color code of a member AP identifies its bit position in the SRG bitmap.

In some embodiments, the method includes adding back one or more APs to the list of APs that are not connected to the access switch to which the target AP is connected and which are associated with RSSIs that are greater than the predetermined RSSI threshold value of the target AP.

In some embodiments, the method includes identifying at least one hidden AP that is not detectable by the target AP and adding the at least one hidden AP to the list of APs. In some embodiments, the at least one hidden AP is identified in a neighbor report transmitted by a station associated with the target AP.

In some embodiments, the method includes removing APs from the list of AP that have overlapping BSS power detection (OBSS-PD) levels different from OBSS-PD levels of the target AP.

In some embodiments, the method includes the target AP performing the method.

In accordance with the present disclosure, an access point device can include one or more computer processors; and a computer-readable storage medium comprising instructions for controlling the one or more computer processors to: receive a received signal strength indication (RSSI) proximity threshold value; identify one or more APs, among a plurality of APs, that are in radio frequency (RF) proximity to the access point device based on a comparison between the RSSI proximity threshold value of the access point device and respective RSSIs associated with the one or more APs; and broadcast a list of the identified one or more APs to stations associated with the access point device.

In some embodiments, the broadcast list of identified one or more APs indicates to a station receiving the list that it can transmit on a channel that is occupied by the one or more APs.

In some embodiments, each AP in the one or more APs is associated with a basic service set (BSS) color code, wherein the computer-readable storage medium further comprises instructions for controlling the one or more computer processors to generate a bitmap that identifies the one or more APs by setting bits in the bitmap that are addressed by the BSS color codes of the one or more APs and to broadcast the list of the identified one or more APs by broadcasting the bitmap.

In some embodiments, the computer-readable storage medium further comprises instructions for controlling the one or more computer processors to identify, among the plurality of APs, at least one hidden AP that is not detectable by the access point device and to add the at least one hidden AP to the one or more APs.

In some embodiments, the computer-readable storage medium further comprises instructions for controlling the one or more computer processors to generate an RSSI for a detected signal transmitted by a given AP, wherein the given AP is deemed to be in RF proximity to the access point device when the generated RSSI is greater than the RSSI proximity threshold value.

In some embodiments, the one or more APs have overlapping BSS power detection (OBSS-PD) levels that are same as OBSS-PD levels of the access point device.

In some embodiments, the computer-readable storage medium further comprises instructions for controlling the one or more computer processors to receive the RSSI proximity threshold value from a controller.

In accordance with the present disclosure, an apparatus can include one or more computer processors; and a computer-readable storage medium comprising instructions for controlling the one or more computer processors to: obtain a received signal strength indication (RSSI) proximity threshold value; define a spatial reuse group (SRG) specific to a first AP among a deployment of a plurality of APs, wherein the computer-readable storage medium further comprises instructions for controlling the one or more computer processors to: receive from the first AP, RSSIs corresponding to signals broadcast by the plurality APs and detected by the first AP; identify APs among the plurality of APs that are in radio frequency (RF) proximity to the first AP by comparing the received RSSIs to the RSSI proximity threshold value; and create a bitmap, representative of the SRG, that identifies a group of APs that are in RF proximity to the first AP; and transmit the bitmap to the first AP, wherein the bitmap is broadcast by the first AP and is detected by stations associated with the first AP.

In some embodiments, members in the group of APs are identified by respective bit positions in the bitmap, wherein APs are associated with basic service set (BSS) color codes, wherein the BSS color code of a member AP identifies its bit position in the bitmap.

In some embodiments, the computer-readable storage medium further comprises instructions for controlling the one or more computer processors to identify at least one hidden AP in RF proximity to the first AP that is not detectable by the first AP, wherein the created bitmap includes the at least one hidden AP in the group of APs.

In some embodiments, an SRG is defined for each AP among the plurality of APs, wherein a bitmap representative of each SRG is transmitted to the respective AP.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
obtaining a list of access points (APs), among a plurality of APs, that are co-channel with a target AP;
removing from the list of APs one or more APs that are not connected to an access switch to which the target AP is connected;
removing from the list of APs one or more APs whose respective associated received signal strength indications (RSSIs) are less than a predetermined RSSI proximity threshold value of the target AP;
creating and storing a spatial reuse group (SRG) bitmap to identify members in the list of APs; and
broadcasting the SRG bitmap using signaling in accordance with the IEEE 802.11ax standard.

2. The method of claim 1, wherein when the broadcast SRG bitmap is received by a station associated with the target AP, the SRG bitmap indicates to the station that the station can transmit on a channel that is occupied by an AP identified in the SRG bitmap.

3. The method of claim 1, wherein members in the list of APs are identified by respective bit positions in the SRG bitmap, wherein APs are associated with basic service set (BSS) color codes, wherein the BSS color code of a member AP identifies its bit position in the SRG bitmap.

4. The method of claim 1, further comprising adding back one or more APs to the list of APs that are not connected to the access switch to which the target AP is connected and which are associated with RSSIs that are greater than the predetermined RSSI threshold value of the target AP.

5. The method of claim 1, further comprising identifying at least one hidden AP that is not detectable by the target AP and adding the at least one hidden AP to the list of APs.

6. The method of claim 5, wherein the at least one hidden AP is identified in a neighbor report transmitted by a station associated with the target AP.

7. The method of claim 1, further comprising removing APs from the list of AP that have overlapping BSS power detection (OBSS-PD) levels different from OBSS-PD levels of the target AP.

8. The method of claim 1, further comprising repeating the method for each AP among the plurality of APs to generate an AP list that is specific to said each AP, wherein the method is performed by a controller in communication with the plurality of APs.

9. The method of claim 1, further comprising the target AP performing the method.

10. An access point device comprising:
one or more computer processors; and
a non-transitory computer-readable storage medium comprising instructions for controlling the one or more computer processors to:
receive a list of access points (APs), among a plurality of APs, that are co-channel with a target AP;
remove from the list of APs one or more APs that are not connected to an access switch to which the target AP is connected;
remove from the list of APs one or more APs whose respective associated received signal strength indications (RSSIs) are less than a predetermined RSSI proximity threshold value of the target AP;
create and store a spatial reuse group (SRG) bitmap to identify members in the list of APs; and
broadcast the SRG bitmap using signaling in accordance with the IEEE 802.11ax standard.

11. The access point device of claim 10, wherein when the broadcast SRG bitmap is received by a station associated with the target AP, the SRG bitmap indicates to the station that the station can transmit on a channel that is occupied by an AP identified in the SRG bitmap.

12. The access point device of claim 11, wherein the non-transitory computer-readable storage medium further comprises instructions for controlling the one or more computer processors to add one or more APs back to the list of APs that are not connected to the access switch to which the target AP is connected and which are associated with RSSIs that are greater than the predetermined RSSI threshold value of the target AP.

13. The access point device of claim 10, wherein members in the list of APs are identified by respective bit positions in the SRG bitmap, wherein APs are associated with basic service set (BSS) color codes, wherein the BSS color code of a member AP identifies its bit position in the SRG bitmap.

14. The access point device of claim 10, wherein the non-transitory computer-readable storage medium further comprises instructions for controlling the one or more computer processors to remove APs from the list of AP that have overlapping BSS power detection (OBSS-PD) levels different from OBSS-PD levels of the target AP.

15. An access point device comprising:
one or more computer processors; and
a non-transitory computer-readable storage medium comprising instructions for controlling the one or more computer processors to:
receive information that identifies a plurality of first access points (APs), among a plurality of APs, that are co-channel with a target AP;
remove from the plurality of first APs one or more APs that are not connected to an access switch to which the target AP is connected;
remove from the plurality of first APs one or more APs whose respective associated received signal strength indications (RSSIs) are less than a predetermined RSSI proximity threshold value of the target AP;
create and store membership information that identifies members in the plurality of first APs; and
broadcast the membership information to the plurality of APs.

16. The access point device of claim 15, wherein the non-transitory computer-readable storage medium further comprises instructions for controlling the one or more computer processors to add one or more APs back to the plurality of first APs that are not connected to the access switch to which the target AP is connected and which are associated with RSSIs that are greater than the predetermined RSSI threshold value of the target AP.

17. The access point device of claim 15, wherein the non-transitory computer-readable storage medium further comprises instructions for controlling the one or more computer processors to identify at least one hidden AP that is not detectable by the target AP and adding the at least one hidden AP to the plurality of first APs.

18. The access point device of claim 15, wherein the non-transitory computer-readable storage medium further comprises instructions for controlling the one or more computer processors to receive a neighbor report transmitted by a station associated with the target AP, wherein the at least one hidden AP is identified in the neighbor report.

* * * * *